(12) United States Patent
Fox et al.

(10) Patent No.: US 11,397,859 B2
(45) Date of Patent: Jul. 26, 2022

(54) PROGRESSIVE COLLOCATION FOR REAL-TIME DISCOURSE

(71) Applicant: International Business Machines Corporation, Armonk, NY (US)

(72) Inventors: Jeremy R. Fox, Georgetown, TX (US); Kelley Anders, East New Market, MD (US); Jonathan D. Dunne, Dungarvan (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 16/567,129

(22) Filed: Sep. 11, 2019

(65) Prior Publication Data

US 2021/0073336 A1 Mar. 11, 2021

(51) Int. Cl.
*G06F 40/30* (2020.01)
*G06F 16/9535* (2019.01)
*G06N 3/04* (2006.01)
*G06N 3/08* (2006.01)

(52) U.S. Cl.
CPC .......... *G06F 40/30* (2020.01); *G06F 16/9535* (2019.01); *G06N 3/0445* (2013.01); *G06N 3/0454* (2013.01); *G06N 3/0472* (2013.01); *G06N 3/08* (2013.01)

(58) Field of Classification Search
CPC ... G06F 7/2785; G06F 16/9534; G06N 3/454; G06N 3/0445; G06N 3/472; G06N 3/08
See application file for complete search history.

(56) References Cited

U.S. PATENT DOCUMENTS

| 7,953,219 | B2 | 5/2011 | Freedman |
| 8,346,563 | B1 | 1/2013 | Hjelm |
| 9,037,967 | B1 | 5/2015 | Al-Jefri |
| 2006/0100876 | A1* | 5/2006 | Nishizaki ............... G10L 15/32 704/257 |
| 2007/0016397 | A1 | 1/2007 | Lu |
| 2007/0214097 | A1 | 9/2007 | Parsons |
| 2009/0198488 | A1 | 8/2009 | Vigen |
| 2011/0191364 | A1 | 8/2011 | Lebeau |
| 2014/0207457 | A1* | 7/2014 | Biatov ................. G10L 15/063 704/243 |

(Continued)

FOREIGN PATENT DOCUMENTS

| CN | 107562717 A | 1/2018 |
| CN | 109033084 A | 12/2018 |

(Continued)

*Primary Examiner* — Kevin Ky
(74) *Attorney, Agent, or Firm* — Randy E. Tejeda (57) ABSTRACT

In an approach to training a corpus link model and generating collocated terms for intra-channel and inter-channel activity, one or more computer processors train a corpus link model based on an analysis of a linguistic corpus and an analysis of one or more author metrics. The one or more computer processors generate one or more collocated terms based on one or more calculations by the trained corpus link model. The one or more computer processors generate a co-occurrence rating for each of the one or more generated collocated terms. The one or more computer processors display the one or more generated collocated terms according to the generated co-occurrence rating of each collocated term.

21 Claims, 5 Drawing Sheets

(56) References Cited

U.S. PATENT DOCUMENTS

| | | | |
|---|---|---|---|
| 2014/0280638 A1 | 9/2014 | O'Dell | |
| 2016/0012115 A1* | 1/2016 | Vata | G06F 16/24578 |
| | | | 707/730 |
| 2016/0041990 A1* | 2/2016 | Dabah | G06F 40/284 |
| | | | 707/722 |
| 2018/0081627 A1 | 3/2018 | Bajekal | |
| 2018/0365212 A1* | 12/2018 | Banerjee | H04L 51/02 |
| 2019/0236139 A1* | 8/2019 | DeFelice | G06F 40/56 |

FOREIGN PATENT DOCUMENTS

| | | |
|---|---|---|
| CN | 109614476 A | 4/2019 |
| CN | 109684483 A | 4/2019 |

\* cited by examiner

PROGRESSIVE COLLOCATION FOR REAL-TIME DISCOURSE

BACKGROUND

The present invention relates generally to the field of communication, and more particularly to real-time communication applications.

The increasing growth and popularity of modern-day collaborative communication application and suites, within organizations, groups, and companies, has dramatically influenced the need for accurate, reliable, and search term generation and applicability. Modern collaborative communication suites and applications have a plurality of contained chat rooms and channels, each, typically, dedicated to a topic, motif, discipline, subject, or purpose. While solutions exist for determining related terms such as probabilistic searching, adaptive learning searches, and corpus linguistics analysis methods, these solutions are wholly ineffective due to the solution's reliance on generalized probabilistic models utilizing incomplete sentences, phrasing and searches with vague terms leading to ambiguity and irrelevant search results. Furthermore, said solutions do not create specific allowances or assumptions for specific user linguistic tendencies and propensities contained in a plurality of channels or sub-channels within a collaborative communication application.

Collaborative software or groupware are application software designed to help a plurality of individuals, involved in a common task, to achieve one or more cooperative goals. In terms of the level of interaction, collaborative software may be divided into: real-time collaborative editing (RTCE) platforms that allow multiple users to engage in live, simultaneous, and reversible editing of a single file, and version control (e.g., revision control and source control) platforms, which allow separate users to make parallel edits to a file, while preserving every saved edit as multiple files. Collaborative software is a broad concept that overlaps considerably with computer-supported cooperative work (CSCW). Collaborative work systems become a useful analytical tool to understand the behavioral and organizational variables that are associated to the broader concept of CSCW.

A recurrent neural network (RNN) is a class of artificial neural network where connections between nodes form a directed graph along a sequence allowing the network to exhibit temporal dynamic behavior for a time sequence. Unlike feedforward neural networks, RNNs can use internal states (memory) to process sequences of inputs allowing the RNN to be applicable to tasks such as unsegmented connected handwriting recognition or speech recognition. Long short-term memory (LSTM) units are alternative layer units of a recurrent neural network (RNN). An RNN composed of LSTM units is referred as a LSTM network. A common LSTM unit is composed of a cell, input gate, output gate, and forget gate. The cell remembers values over arbitrary time intervals and the gates regulate the flow of information into and out of the cell. Gated recurrent units (GRUs) are a gating mechanism in recurrent neural networks. GRU performance on polyphonic music modeling and speech signal modeling was found to be similar to LSTM. However, GRUs exhibit better performance on smaller datasets.

Collaborative services are ubiquitous in modern organizations, allowing a plurality of individuals and groups the ability to have multiple, concurrent discussions in a real-time. With respect to collaborative services and applications, real-time chat is the predominant method of communication for most organizations. Collaborative chat applications are used by members of a team, organization, and/or company to identify, diagnose, and remediate problems and issues. For example, software development teams or support staff utilize collaboration chat applications to identify sections of faulty code and discuss potential solutions (e.g., alternative code structures, etc.). In this example, different software or support groups may have distinct channels or sub-channels dedicated to a specific issue or problem.

Generic search term generation and production, when applied to dedicated channels or chat rooms within real-time collaboration applications, allow for misapplied, irrelevant, and vague collocated terms that are ineffective, impede others from finding pertinent information relevant to a channel or chat room, and prevent others from communicating and engaging effectively in meaningful discourse. Traditionally, term generation systems are ineffective in enabling a user the ability to be provided an optimal set of linked terms within the construct of a collaborative chat search. Furthermore, ineffective, traditional systems attempt to disambiguate the meaning of analyzed communications using the placements of words, position, and grammar into fixed hierarchical structures and filter search results utilizing the fixed hierarchical structure. Commonly, hierarchical structures are known to perform poorly when generalizing outside an initial communication scope (e.g., different group of people, topic, or channel).

SUMMARY

A first aspect of the present invention discloses a computer-implemented method including one or more computer processors training a corpus link model based on an analysis of a linguistic corpus and an analysis of one or more author metrics. The one or more computer processors generate one or more collocated terms based on one or more calculations by the trained corpus link model. The one or more computer processors generate a co-occurrence rating for each of the one or more generated collocated terms. The one or more computer processors display the one or more generated collocated terms according to the generated co-occurrence rating of each collocated term. Embodiments of the present invention utilize trained models based on specific corpuses to generate generalized collocated terms, allowing the presentation of an optimal set of linked terms within the construct of a collaborative chat search.

A second aspect of the present invention discloses a computer-implemented method including one or more computer processors training a corpus link model based on an analysis of a linguistic corpus and an analysis of one or more author metrics. The one or more computer processors generate one or more collocated terms based on one or more calculations by the trained corpus link model. The one or more computer processors generate a co-occurrence rating for each of the one or more generated collocated terms. The one or more computer processors tag one or more webpages with the one or more generated collocated terms according to the co-occurrence rating of each collocated term. Embodiments of the present invention utilize trained models based on specific corpuses to generate generalized collocated terms, allowing the tagging of an optimal set of linked terms within the construct of a content management system.

A third aspect of the present invention discloses a computer program product including one or more computer readable storage device and program instructions stored on the one or more computer readable storage device. The stored program instructions include program instructions to train a corpus link model based on an analysis of a linguistic corpus and an analysis of one or more author metrics. The stored program instructions include program instructions to generate one or more collocated terms based on one or more calculations by the trained corpus link model. The stored program instructions include program instructions to generate a co-occurrence rating for each of the one or more generated collocated terms. The stored program instructions include program instructions to display the one or more generated collocated terms according to the generated co-occurrence rating of each collocated term. Embodiments of the present invention utilize trained models based on specific corpuses to generate generalized collocated terms, allowing the presentation of an optimal set of linked terms within the construct of a collaborative chat search.

A fourth aspect of the present invention discloses a computer system including one or more computer processors and one or more computer readable storage device, where the program instructions are stored on the one or more computer readable storage device for execution by at least one of the one or more computer processors. The stored program instructions include program instructions to train a corpus link model based on an analysis of a linguistic corpus and an analysis of one or more author metrics. The stored program instructions include program instructions to generate one or more collocated terms based on one or more calculations by the trained corpus link model. The stored program instructions include program instructions to generate a co-occurrence rating for each of the one or more generated collocated terms. The stored program instructions include program instructions to display the one or more generated collocated terms according to the generated co-occurrence rating of each collocated term. Embodiments of the present invention utilize trained models based on specific corpuses to generate generalized collocated terms, allowing the presentation of an optimal set of linked terms within the construct of a collaborative chat search.

DETAILED DESCRIPTION

Embodiments of the present invention recognize that collaborative environments can introduce confusion and readability issues. Some embodiments of the present invention recognize that providing collocated and colligated terms reduces confusion and increases readability. Embodiments of the present invention improve collaborative systems by training one or models based on specific language and discourse contained within a channel, sub-channel, chat room, group, or application and generating specific collocated and colligated terms utilizing the trained models. Embodiments of the present invention improve collaborative systems by improving training models and the ability of the models to effectively recognize and generate collocated and colligated terms. Embodiments of the present invention allow for generated collocated and colligated terms to be utilized in searches, specifically search term recommendation. Embodiments of the present invention allow generated collocated and colligated terms to be utilized in content, topic, and file tagging. Embodiments of the present invention utilize the generated collocated and colligated terms to create efficient search engine optimization tags and metadata.

Embodiments of the present invention utilize generated collocated and colligated terms (e.g., used to frame search collation for chat discourse) in content management systems, aiding in understanding which terms are most likely search for. Embodiments of the present invention utilize generated collocated and colligated to tag content or formulate titles that would improve searchability and reduce confusion. Embodiments of the present invention model the trending of location from one location to another and utilizes said model to add weight to point in time interactions. Embodiments of the present invention generate predictive progressive collocation group models based on previous conservations of a like group on topical matters. Embodiments of the present invention profile at a group level, allowing the invention to generate terms based on linguistical patterns for like terms and subject matter. Embodiments of the present invention utilizes the progressive collocation group models to predict pattern progression and the evolution of search terms based on group activities (e.g., software support team). Embodiments of the present invention recognize that system efficiency (e.g., reduction in system processing requirements such as memory and central processing unit utilization) can be improved by eliminating the generation of unlikely or improbable collocated terms. No art combines corpus linguistic analysis and author frequency analysis to produce the fidelity of solution that the present invention provides for the problem space. Implementation of embodiments of the invention may take a variety of forms, and exemplary implementation details are discussed subsequently with reference to the Figures.

The present invention will now be described in detail with reference to the Figures.

Figure 1:
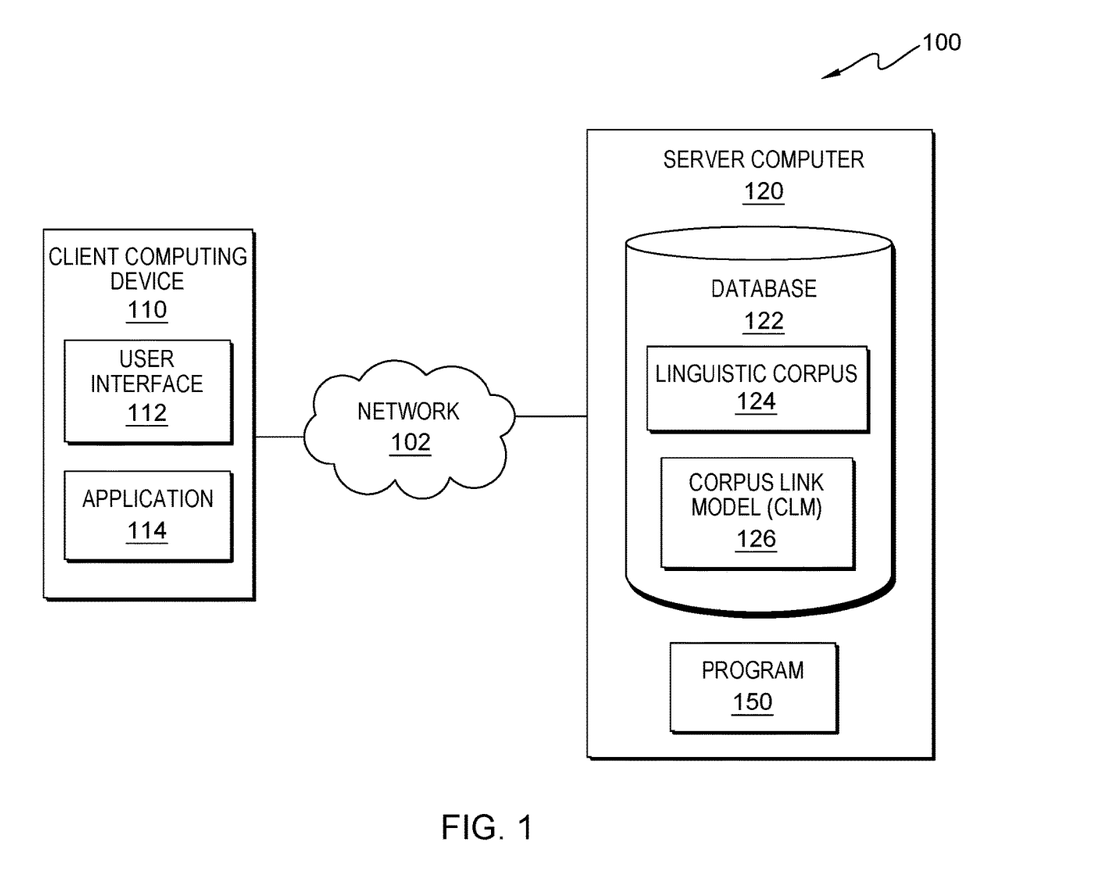
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes client computing device 110 and server computer 120, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 110, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Client computing device 110 may be any electronic device or computing system capable of processing program instructions and receiving and sending data. In some embodiments, client computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, client computing device 110 may represent a server computing system utilizing multiple computers as a server system, such as in a cloud computing environment. In general, client computing device 110 is representative of any electronic device or combination of electronic devices capable of executing machine readable program instructions as described in greater detail with regard to FIG. 4, in accordance with embodiments of the present invention. Client computing device 110 contains user interface 112 and application 114.

User interface 112 is a program that provides an interface between a user of client computing device 110 and a plurality of applications that reside on client computing device 110 (e.g., application 114) and/or may be accessed over network 102. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. In an embodiment, user interface 112 sends and receives information through application 114 to user program 150.

Application 114 is a set of one of more programs designed to carry out the operations for a specific application to assist a user to perform an activity (e.g., word processing programs, spread sheet programs, media players, web browsers). In the depicted embodiment, application 114 is a set of one or more programs designed to facilitate in group communications, collaborative problem solving, and coordination activities. In this embodiment, application 114 contains a plurality of channels, chat rooms, or partitioned communication groups wherein each channel is dedicated to a specific topic or discussion category. In the depicted embodiment, application 114 resides on client computing device 110. In another embodiment, application 114 resides on server computer 120 or on another device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with client computing device 110 and other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside on client computing device 110 or elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as linguistic corpus 124, described in detail below. In the depicted embodiment, database 122 contains linguistic corpus 124 and corpus link model (CLM) 126.

Linguistic corpus 124 is a repository for a plurality of text-based corpora (i.e., natural language representation of auditory speech, speech utterances, text sequences, computer encoded sequences, etc.). In an embodiment, linguistic corpus 124 contains one or more historical queries, communications, statements, discussions, comments, utterances with one or more authors, individuals, and/or groups. In another embodiment, linguistic corpus 124 contains historical collocated and colligated terms, associated topics, and associated author metrics (e.g., author-topic mappings, channel frequency, temporal bounds and considerations (e.g., earliest/latest posts, average time of day when posting, etc.), author post frequency, average post length, average post reading level, frequently utilized terms/phrases, etc.). In an embodiment, said historical communications are categorized, organized, and/or structured in relation to the specific author, individual, channel, sub-channel, chat room, or group. For example, all the historical communications contained within a specific channel are structured and partitioned together. In various embodiments, the information contained in linguistic corpus 124 is temporally structured. For example, said information may be constrained or limited with regards to a time period (e.g., discussions in the last month). In another embodiment, said information is limited to a specific group, author, or topic (e.g., discussion regarding a specific query, topic, genre, problem, issue, solution, etc.).

In an embodiment, linguistic corpus 124 contains unprocessed communications, discussions, and utterances. In another embodiment, linguistic corpus 124 may include a series of vectors corresponding to a plurality of determined features including, but not limited to, author, group, topic, identified problem, associated solution, related topic/query sets, technological field (e.g., computer science, mechanical, biology, chemistry, etc.), programmatic conventions (e.g., programming language, programming language category (e.g., strong type, object oriented, procedural, etc.), and temporal events (e.g., subsets constrained by pre-determined intervals (e.g., all communications related to a specific topic or channel made in the last year), software lifecycles (e.g., sunsetting of software, etc.), etc.).

In various embodiments, linguistic corpus 124 includes collections of queries (e.g., associated topics), collocated and colligated term pairs (e.g., additional search and query terms). Each pair includes a query and a corresponding collocated and colligated term or sequence. A query term or sequence may be a textual term or sequence, in a natural language or a computer-generated representation. For example, the query (e.g., topic) "allergy" is paired with the collocated and colligated terms "acute" and "concerns" and forming the complete query sequence/phrase "acute allergy concerns." In another embodiment, channel specific statistics such as historical topics, authors, related collocated terms, related colligated terms, and related search terms are included as features. In another embodiment, author metrics are attached to topic terms as features. In a further embodiment, author metrics specific to a channel or communication medium (e.g., chat applications, channels, sub-channels, chatrooms, or environments) are attached to topic terms as features. In various embodiments, a query/collocated term set contains associated communications, discussions, topics, comments, and/or statements either in a structured or unstructured form. In another embodiment, a collocated and colligated term is transformed into a label and attached to one or more associated queries or topic terms. In yet another embodiment, a pre-determined, historical, and/or generated collocated term efficacy rating is attached as a feature, label, or as an expected output to one or more topic sets. In an embodiment, linguistic corpus 124 may be represented as a graph database, where communications, discourse, and/or discussions are stored in relation to the authors, queries, or topics forming sequences of similar query/topic/communication and channel/author combinations (e.g., collaborative author graph).

Corpus link model (CLM) 126, hereinafter CLM 126, contains one or more models, containers, documents, sub-documents, matrices, vectors, and associated data, modeling one or more feature sets, such as results from linguistic analysis. In an embodiment, linguistic analysis determines query characterizations and representations, collocated term consolidation, author metrics, and intra-arrival time of post frequency. In an embodiment, CLM 126 contains one or more generative (e.g., latent Dirichlet allocation (LDA), etc.) or discriminative (e.g., support vector machine (SVM), etc.) statistical models utilized to calculate the conditional probability of an observable X, given a target y, symbolically, $P(X|Y=y)$. In various embodiments, CLM 126 may train and utilize one or more discriminative models to calculate the conditional probability of the target Y, given an observation x, symbolically, $P(Y|X=x)$.

CLM 126 assesses a query (e.g., topic) or query sequence by considering different features, available as structured or unstructured data, and applying relative numerical weights. Program 150 feeds a vectorized, encoded, or computer represented training set of feature data to CLM 126. In various embodiments, the data (topic or topic term) is labeled with collocated and/or colligated terms enabling CLM 126 to "learn" what features (e.g., topic, topic terms, author metrics, group metrics, etc.) are correlated to a specific collocated term or phrase. In various embodiments, the features include metadata (e.g., targeted channels (e.g., channel members, topics, purposes, etc.), similar topics, associated authors, and environmental considerations (e.g., platform, version, device specific variables, etc.) in addition to the topic. In a further embodiment, the training set includes examples of a plurality of features, such as tokenized topic/search term segments, comments, statements, discussions, variables, objects, data structures, etc. CLM 126 "learns" from the training set of data to distinguish between probable and improbable (e.g., applied against a predetermined efficacy threshold) collocated terms when applied to one or more specific topics or terms (e.g., limited by author, application, or channel/chat room, etc.). Once trained, CLM 126 can generate one or more collocated colligated terms, associated probabilities, and co-occurrence ratings based on the data aggregated and fed by program 150. In an embodiment, CLM 126 utilizes the following corpus linguistic analysis [termA, collation_left, loglikeihood, collation_right, loglikelihood] and author analysis [userA, distance, post_frequency] as inputs when assessing a query. In this embodiment, CLM 126 assesses the query utilizing the following structure [stringA, stringL, float, stringR, float]+[userA, distance, post_frequency], representing a model trained utilizing corpus linguistic analysis and author analysis.

In an embodiment, CLM 126 utilizes deep learning techniques to pair queries and associated topics to probable collocated terms. In various embodiments, CLM 126 utilizes transferrable neural network algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In various embodiments, CLM 126 is a simple neural network. In a further embodiment, CLM 126 is a single layer feed neural network containing an affine transformation followed by element-wise nonlinearity, $y=f(Wx+b)$, where f is an element-wise non-linearity, such as sigmoid or hyperbolic tangent, and b is a bias vector. Said simple neural network can be extended with multiple hidden layers, where each layer transforms the output of the previous hidden layer to generate output for the next layer, a multi-layered perceptron (MLP).

In the depicted embodiment, CLM 126 contains one or more recurrent neural networks (RNNs). In this embodiment, the RNNs process sequential data ($x_1, x_2 \ldots , x_t$) to calculate subsequent hidden states while the parameters of the models remain the same. RNNs can be "unfolded", taking the previous hidden state and input at that time step to generate the input for the next series of time steps, allowing information to flow through the network, so that the last cell includes information derived from all the previous cells. In an embodiment, CLM 126 utilizes gated recurrent units (GRU). GRUB simplify the training process while reducing the amount of necessary computational resources. In another embodiment, CLM 126 utilizes LSTM. LSTM entails a more robust process, requiring more computational resources but LSTM is more effective when training from large datasets. In various embodiments, the hidden layers of CLM 126 may be unidirectional or bidirectional. In another embodiment, CLM 126 maintains one or more stackable RNNs for each channel or chat room contained within one or more applications or communication mediums. In this embodiment, every channel within an application will have one or more dedicated RNNs allowing optimal domain linguistic term matching for said channel. The training and utilization of CLM 126 is depicted and described in further detail with respect to FIG. 2.

In an embodiment, program 150 utilizes the models described above, in conjunction with user feedback, back testing, and/or probabilistic modeling to generate a level of co-occurrence (e.g., collocation/colligation rating (e.g., measure of association, co-occurrence confidence level), etc.) of generated terms. In another embodiment, CLM 126 determines the type of relationship for each generated collocation/colligation term and associated query (e.g., contained topic), such as a syntactic relation, lexical relation, or no linguistically defined relation.

Program 150 is a program for training a corpus link model and generating collocated search terms for intra-channel and inter-channel activity. In the depicted embodiment, program 150 is a standalone software program. In various embodiments, program 150 may implement the following steps. Program 150 trains a corpus link model based on an analysis of a linguistic corpus and an analysis of one or more author metrics. Program 150 generates one or more collocated terms based on one or more calculations by the trained corpus link model. Program 150 generates a co-occurrence rating for each of the one or more generated collocated terms. Program 150 displays the one or more generated collocated terms according to the generated co-occurrence rating of each collocated term. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on client computing device 110 and/or any other computing device (not depicted) within computational environment 100. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
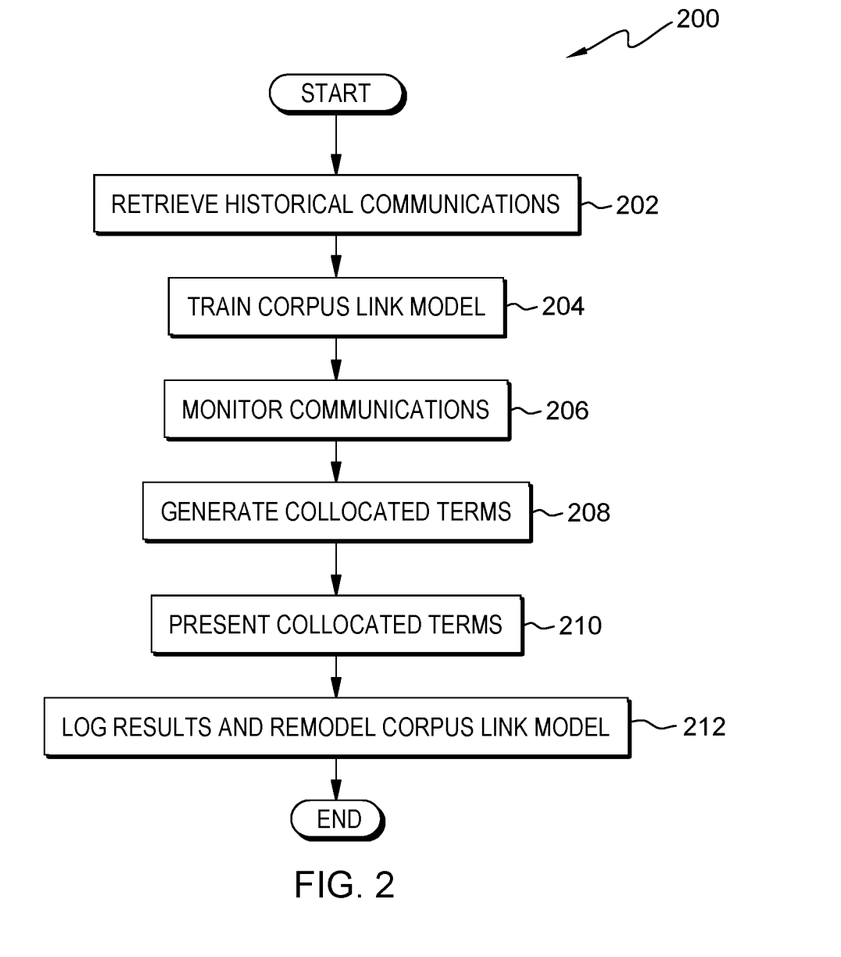
FIG. 2 is a flowchart depicting operational steps of a program, on a server computer within the computational environment of FIG. 1, for training a corpus link model and generating collocated terms for intra-channel and inter-channel activity, in accordance with an embodiment of the present invention.

FIG. 2 is a flowchart depicting operational steps of program 150 for training a corpus link model and generating collocated terms for intra-channel and inter-channel activity, in accordance with an embodiment of the present invention.

Program 150 retrieves historical communications (step 202). In an embodiment, program 150 retrieves all historical communications including, but limited to, queries, messages, conversations, discussions, utterances, and/or statements associated with a specified channel (e.g., chat room, sub-channel, moderated group, etc.), application (e.g., application 114), author (e.g., user), sets of authors, topics, and associated search terms (e.g., collocations and colligations). In another embodiment, program 150 can process the retrieved historical communications (e.g., queries and messages) into multiple sets (e.g., by author, channel, application, topic, etc.). In yet another embodiment, program 150 partitions historical communications into discrete sets containing differently processed versions of the same discussion. In various embodiments, program 150 defines the bounds of a by utilizing predetermined response intervals. For example, if the user does not respond to a message, topic, or contribute to a discussion for more than a week, then program 150 determines that any communications sent after the time threshold is a new, distinct conversation, implying that the topic of the discussion may have shifted. In this embodiment, program 150 partitions the historical communications into one or more sets defined by temporal constraints as described above. In another embodiment, the retrieved historical communications contain information or metadata regarding user behavior such as frequently utilized search terms and associated topics.

Program 150 then utilizes natural language processing (NLP) techniques and corpus linguistic analysis techniques (e.g., syntactic analysis, etc.) to identify parts of speech and syntactic relations between various portions of a communication (i.e., query). Program 150 utilizes corpus linguistic analysis techniques, such as part-of-speech tagging, statistical evaluations, optimization of rule-bases, and knowledge discovery methods, to parse, identify, and evaluate portions of a communication. In an embodiment, program 150 utilizes part-of-speech tagging to identify the particular part of speech of one or more words in a communication based on its relationship with adjacent and related words. For example, program 150 utilizes the aforementioned techniques to identity the nouns, adjectives, adverbs, and verbs in the example sentence: "Henry, I believe this link will solve your issue". In this example, program 150 identifies "Henry", "link", and "issue" as nouns, "solve" and "believe" as verbs. In another embodiment, program 150 utilizes term frequency-inverse document frequency (tf-idf) techniques to calculate how important a term is to the communication, sentence, conversation, document, or historical chat corpus. In another embodiment, program 150 utilizes tf-idf to calculate a series of numerical weights for the words extracted from historical communications. In a further embodiment, program 150 utilizes said calculations to identify and weigh frequently used terms. For example, program 150 increases the weight of a word proportionally to the frequency the word appears in the conversation offset by the frequency of documents (e.g., communications, discussions, etc.), in linguistic corpus 124, that contain the word. In an embodiment, program 150 utilizes the weights calculated from tf-idf to initialize one or more instances of CLM 126.

Program 150 may utilize one or more models (e.g., instances of CLM 126 or a plurality of models contained in CLM 126), such as biterm topic modeling and LDA, to identify topics and themes within conversations, messages, discussions, queries, etc. In an embodiment, program 150 utilizes biterm topic modeling to model the generation of co-occurrence patterns (e.g., biterms) in a document. Program 150 utilizes biterm topic modeling to model the word co-occurrence (e.g., collocation and colligations) patterns thus enhancing the identification of topics. In various embodiments, program 150 utilizes aggregated patterns in a corpus to identify topics based on co-occurrence patterns (e.g., optimal search terms) at the channel-level and program 150 may calculate co-occurrence patterns to an application level (e.g., organizational, team, corporation, etc.). In another embodiment, program 150 utilizes biterm topic modeling to calculate the probability that a series of words are representative of a specified topic. In another embodiment, program 150 may utilize latent semantic analysis to decompose a matrix of documents and terms (e.g., multiple comments, conservations, etc.) into multiple sub-matrices, such as channel-topic matrices, author-topic, or topic-search term matrices. In an embodiment, program 150 utilizes probabilistic latent semantic analysis to calculate a probabilistic model that may be utilized to generate one or more probabilistic matrices such as the sub-matrices listed above.

In various embodiments, program 150 utilizes latent Dirichlet allocation (LDA) to identify one or more topics that may be contained within a communication or query. LDA allows sets of observations to be explained by unobserved groups that explain why some parts of the data are similar. For example, if observations are words (e.g., terms) collected into documents, LDA posits that each document is a mixture of a small number of topics and the presence of each word is attributable to one of the topics of the document. Program 150 utilizes LDA to decompose a document (e.g., communications, queries, discussions, collection of comments, etc.) as a mixture of various topics. For example, an LDA model might have topics that can be classified as ALLERGY_related and MEDICAL_related. The LDA model contains the probabilities of topic associations of various words, such as sneezing, pollen, and antihistamine, which can be classified and interpreted by as ALLERGY_related. The MEDICAL_related topic, likewise, has probabilities of being associated with the terms: hospital, platelets, and bone. Words without special relevance, such as "the", will have a split probability between classes or, dependent on a similarity threshold, be considered a novel topic.

In an embodiment, topics are identified based on automatic detection of the likelihood of term co-occurrence. A lexical term may occur in several topics with a different probability, however, with a different typical set of neighboring words in each topic. In an embodiment, program 150 associates the topics and linguistic tendencies of the historical discussions identified above with authors creating author-topic mappings. Program 150 utilizes the aforementioned NLP techniques to create and monitor a plurality of author-based metrics (e.g., author-topic mappings, channel or chatroom frequency, temporal bounds and considerations (e.g., earliest/latest posts, average time of day when posting, etc.), author post frequency, average post length, average post reading level, frequently utilized terms/phrases, etc.) In an embodiment, the author metrics are categorized, organized, and/or structured in relation to the specific author, individual, channel, chatroom, or group.

Program 150 then processes each partitioned set based on one or more feature sets. For example, a feature set that only contains specific topics such as system environmental parameters (e.g., platform, versions, device specific variables, etc.). In another example, the feature set contains information regarding a specific author in a specific channel. Program 150 then may transform each term into a corresponding stem/root equivalent, eliminating redundant punctuation, particles, grammatical tenses, etc. In yet another embodiment, program 150 non-deterministically divides the processed sets into training sets and into test sets. In a further embodiment, program 150 attaches the corresponding intended collocated term to each topic term as a label.

Program 150 then vectorizes the partitioned topic/collocated term sets, along with associated discussion and author data. In an embodiment, program 150 utilizes one-hot encoding techniques to vectorize categorical or string-based feature sets. For example, when vectorizing feature sets of individual words, program 150 creates a one-hot vector comprising a 1×N matrix, where N symbolizes the number of distinguishable words. In another embodiment, program 150 utilizes one-of-c coding to recode categorical data into a vectorized form. For example, when vectorizing an example categorical feature set consisting of [allergy, sneeze, cough], program 150 encodes the corresponding feature set into [[1,0,0], [0,1,0], [0,0,1]]. In another embodiment, program 150 utilizes featuring scaling techniques (e.g., rescaling, mean normalization, etc.) to vectorize and normalize numerical feature sets. In various, program 150 utilizes lda2vec (e.g., word embedding) to convert the aforementioned LDA and biterm topic results, documents, and matrices into vectorized representations.

Program 150 trains corpus link model (step 204). Program 150 trains one or more models contained in CLM 126. In an embodiment, program 150 initializes CLM 126 with randomly generated weights. In an alternative embodiment, program 150 initializes CLM 126 with weights calculated from the analysis described above (e.g., tf-idf, etc.). In an alternative embodiment, program 150 initializes CLM 126 with weights inherited from a historical model. In yet another embodiment, program 150 performs supervised training with the labeled vectorized data, as described in step 202. For example, program 150 feeds query/collocated term pairs into CLM 126, allowing program 150 to make inferences between the query term data and collocated term data (i.e., label). In an embodiment, program 150 trains CLM 126 with a plurality of feature vectors originating from data extracted from related queries, topics, communications, or author specific discussions or queries located in linguistic corpus 124, as detailed above. In an embodiment, program 150 retrieves all historical messages, conversations, discussions, and queries related to a specific query, topic, environment, channel, chatroom, application, recipient, group, author, and/or user. In another embodiment, program 150 retrieves a subset of all historical communication, queries, messages, conversations, and discussions between members of a channel, group, and/or chat application.

In various embodiments, program 150 utilizes supervised training to determine the difference between a prediction and a target (i.e., the error), and back-propagates the difference through the layers such that CLM 126 "learns." In an embodiment, program 150 utilizes stochastic gradient algorithms to implement backpropagation. In another embodiment, program 150 utilizes cosine similarity as a loss function. Program 150 may adjust the learning rate to adjust cross-entropy cost, allowing program 150 to increase or decrease the adaptability of related cells and layers. In an embodiment, program 150 determines whether a sufficient precision is obtained by utilizing test or held-out sets. If the calculated precision is insufficient, then program 150 continues with supervised training of CLM 126. If the calculated precision is sufficient, then program 150 ends the training process and continues to step 206.

Accordingly, in this embodiment, program 150 trains one or more models based on unique and distinct historical communications contained in one or more channels, groups, and collaborative applications (e.g., corpus). In some instances, program 150 trains the models according to individual groups or specific topics. Thus, this embodiment is used to create a plurality of models trained and designed to facilitate the generation of collocated terms specific to a specified channel or group corpus.

Program 150 monitors communications (step 206). In various embodiments, communications include, but are not limited to, the detection, entry, and/or transmission of one or more user utterances, comments, sentences, search queries, and/or search terms. In an embodiment, program 150 prevents transmission of one or more search terms contained in a query (e.g., search query) until a collocation rating is calculated and/or one or more collocated terms are generated. In various embodiments, program 150 replaces and/or substitutes a graphical transmission icon within a user interface (e.g., user interface 112). For example, chat applications (e.g., application 114) have graphical icons that when activated transmit a search. In this example, program 150 replaces one or more icons, along with respective triggers, to intercept and retain the search before transmission. In yet another embodiment, program 150 may analyze outbound traffic of client computing device 110 to detect the transmission of a search (e.g., query). In this embodiment, program 150 may retain the search until the search (e.g., query, search terms, etc.) is analyzed, collocated terms are generated, and approved by the user. In yet another embodiment, program 150 detects a message by detecting the user entering words in an application (e.g., application 114) element, such as a search bar or text entry area. In a further embodiment, program 150 may trigger analysis in response to every word or sentence the user inputs. For example, as a user types a search query, program 150 concurrently detects the query, extracts associated topic information, and generates one or more collocated terms specific to the communication medium (e.g., channel or chatroom). In an alternative embodiment, program 150 may trigger query analysis after the user stops or ceases inputting or typing text/characters or manipulating user interface 112 for a specified duration. For example, the user begins to input a query and after 5 seconds of non-input, program 150 determines the message is ready to be transmitted and thus analyzes the message.

Program 150 utilizes one or more models contained in CLM 126 to identify and/or match one or more queries and contained topics (e.g., categories, targeted channels, etc.) or topic terms (e.g., terms associated with or that described a topic) of a discussion set (e.g., messages or discussions contained in an application (e.g., chat, specialized channel, etc.)) with collocated terms (e.g., adjacent search terms) based on historical queries and contained topics, associated terms, phrases and data. In another embodiment, CLM 126 generates one or more probabilities (e.g., probability distributions) denoting the likelihood that a given query and topic terms is related to another topic, term, or phrase.

Program 150 generates collocated terms (step 208). Responsive to program 150 monitoring and processing communications (e.g., search queries, find commands, tagging requests, etc.) within one or more chat applications, program 150 extracts, analyzes, and decomposes the information contained in said communications, as discussed in step 202. Program 150 processes the weights and probabilities calculated from CLM 126 utilizing various components of the channel, chatroom, and application specification historical communications, queries, messages, comments, topic terms, common collocated terms, linguistic tendencies, and associated author metrics to generate one or more sets of collocated terms and determine the likelihood (e.g., percentage) of the respective terms. In an embodiment, program 150 utilizes any combination of biterm topic modeling, LDA, and trained cognitive models (e.g., RNN) to identify topics and relevant collocated term sets within queries, conversations, messages, discussions, as detailed in step 202, in one or more chat applications, channels, sub-channels, chatrooms, or environments. In various embodiments, program 150 utilizes transfer learning and transference layers to utilize pretrained, related models to assist, speed up, or supplement any other related model. For example, program 150 trains a model utilizing the communications contained in a tech support channel of a larger collaborative application. In this example, program 150 may utilize transfer learning to generalize the tech support channel model to other related channels.

In an embodiment, program 150 detects, processes, vectorizes, and feeds the identified communications and any contained queries, topics and topic terms into a plurality of trained models within CLM 126. In this embodiment, CLM 126 outputs one or more sets of collocated and colligated terms and associated probabilities based on the one or more fed topic terms. In an embodiment, every model within CLM 126 is pre-trained with training sets specific to a channel, multiple channels, user, group of users, and/or application. Collocation and colligation terms can be generated according to a plurality of organizational schemas such as channel, group, chat room, application, topic, or author specific schemas. In an additional embodiment, CLM 126 is trained and fed with the author metrics of an associated author or group of authors (e.g., members of a channel, sub-channel, etc.). In another embodiment, program 150 utilizes the output generated from CLM 126 to generate a co-occurrence score (e.g., rating) representing the degree of co-occurrence (e.g., likelihood that the generated term is collocated and/or colligated) between collocated terms and the topic of the monitored communications and historical communications contained with linguistic corpus 124. In this embodiment, program 150 inputs a vector containing a sequence of query terms into one or more models contained in CLM 126 and CLM 126 outputs one or more co-occurrence scores. In another embodiment, program 150 utilizes one or more probabilities generated from one or more models, such as the results of the biterm modeling or the LDA output to adjust the weights each of the aforementioned results in proportion to the degree of co-occurrence confidence of each model.

In an embodiment, utilizing the output of CLM 126, program 150 determines whether the probability associated with the generated collocation term is sufficient for an identified topic in a query. In various embodiments, program 150 utilizes a predefined co-occurrence threshold. In another embodiment, if program 150 determines that an output (e.g., generated collocated term) is less than the co-occurrence (e.g., probability, etc.) threshold, then program 150 removes the generated terms and reduces one or more weights, within CLM 126, associated with the generated terms. In an example scenario, a group of developers are troubleshooting a buffer overflow bug and discussing potential solutions in a real-time chat application while program 150 monitors and analyzes the discussion, retrains an associated model, and generates collocation terms in response to a query or topic.

Accordingly, in this embodiment, program 150 utilizes the trained models, as detailed in step 204, to generate one or more collocated terms based on an identified query. In some embodiments, program 150 calculates a co-occurrence score representing a probability that a generated term can be found in proximity to a query term. Thus, this embodiment is used to create effective collocated terms based on the corpus of associated trained models. In an instance, program 150 utilizes a model trained utilizing a corpus based on a distinct channel but related topic, generalizing said model to other problem sets (e.g., other collaborative applications, channels, groups, topics, etc.)

Program 150 presents collocated terms (step 210). Based on one or more generated collocation terms, as described in step 208, program 150 may generate, adjust, and present the generated collocation terms dependent on the capabilities of the associated application (e.g., chat application, etc.). Responsive an associated co-occurrence rating, program 150 generates, displays, modifies, or presents one or more generated collocation terms comments distinguishably (e.g., distinctively, etc.) from the original query. For example, program 150 may present the example generated collocation term "therapy", when presented with a query containing the topic "radiation", forming the modified query "radiation therapy". In various embodiments, program 150 may display the associated co-occurrence rating, as a numerical score, rating, or probability, of a collocated term. In this embodiment, program 150 displays the rating in proximity to the corresponding term. In an embodiment, program 150 retrieves, queries, prompts, or determines user preferences or settings detailing user preferred presentation settings such as level of transparency and text color preferences. In another embodiment, program 150 modifies, transforms, or adjusts one or more stylistic elements including, but not limited to, font, font size, character style, font color, background color, capitalizations, general transparency, and relative transparency, of a display or one or more displayed terms In an embodiment, if the co-occurrence rating does not meet or exceed a predetermined co-occurrence rating threshold, e.g., detailing a lower boundary, then program 150 may delete, remove, hide, or otherwise obscure the associated collocated term and/or related collocated terms. In an embodiment, where program 150 has multiple probable collocated terms (e.g., terms that have associated co-occurrence scores that meet or exceed a threshold), program 150 ranks the terms based on associated generated co-occurrence ratings. For example, as program 150 displays the ranked list of probable collocated terms, program 150 may decrease the font size of displayed terms as the co-occurrence rating of said terms decreases. In this embodiment, program 150 may display all probable collocated terms, allowing the user to select a term, rank one or more terms, and/or provide feedback to the terms.

In an embodiment, program 150 provides generated collocated terms to a content management system (CMS). In this embodiment, the CMS utilizes the collocated terms as metadata and metatags commonly utilized in search engine optimization (SEO). SEO assists in understanding which terms are most likely searched for and then used to tag content or formulate tags. Program 150 can utilize the generated collocation terms when generalized to a similar domain or related topic category such as optimizing a website by editing content, modifying HTML, and associated code to both increase relevance to specific keywords (e.g., topic terms) and allowing efficient indexing by search engines. Program 150 can increase the quality and quantity of web traffic utilizing SEO and generated collocation terms thus increasing the visibility of a web page to users of a search engine. In an embodiment, program 150 utilizes the generated collocated terms to tag one or more webpages to provide keywords and metadata for a plurality of web spiders, web crawlers, and associated search engines. In this embodiment, program 150 utilizes the calculate co-occurrence rating to modify, rank, or remove one or more tagged collocated terms.

Program 150 may create one or more predictive progressive collocation group models based on historical conservations of related or similar groups of an on-going topical matters. The predictive progressive collocation group models allow for frequently communicating groups to be profiled at a group level based on linguistic patterns for similar and related terms and subject matter. In an embodiment, program 150 is implemented within a software support system providing sets of generated collocated terms to a plurality of support teams. In this embodiment, program 150 allows for effective queries by utilizing through group corpus profiling to predict pattern progressions and evolution of topic terms and associated collocated terms (e.g., queries) based on historical software support activities. Program 150 can utilize CLM 126 to calculate and identify collocation trends over a time period. In an embodiment, program 150 models the collocation trends between a plurality of channels within the same chat application, group, or organization. In various embodiments, program 150 utilizes the described models to adjusts a plurality of weights incorporating point in time interactions and group linguistic patterns.

Accordingly, in this embodiment, program 150 presents the generated terms to one or more users. In an instance, program 150 modifies one or more stylistic elements of the presented terms based on the associated co-occurrence score. In an instance, program 150 utilizes the generated terms as metadata and tags commonly utilized in SEO. In another instance, program 150 utilizes the generated terms to create a predictive progressive collocation group, allowing program 150 to profile linguistic patterns of one or more groups. Thus, this embodiment provides a user with an optimal set of linked terms within the construct of a collaborative chat search or content management system.

Program 150 logs relevant communications and remodels the corpus link model (step 212). In one embodiment, program 150 logs relevant conservations, comments, discussions, and associated data into linguistic corpus 124. In another embodiment, program 150 may receive user feedback through a graphical user interface (e.g., user interface 112) on client computing device 110. For example, after program 150 analyzes a query and associated collocated terms, the user can provide feedback for the query and the rated term on a graphical user interface (e.g., user interface 112) of client computing device 110. In an embodiment, feedback may include a simple positive or negative response. In another embodiment, feedback may include a user confirmation of the provided collocated terms. For example, if program 150 generated a low co-occurrence valued collocated term or provided the term in the wrong position in relation to a topic term, the user can provide negative feedback and correctly identity the correct collocated term, relative position, and related communications. In an embodiment, program 150 feeds the user feedback and the corrected term into CLM 126, allowing program 150 to adjust the model accordingly. In another embodiment, program 150 may use one or more techniques of NLP to log whether the response of the user is positive or negative. Program 150 logs relevant conservations, comments, discussions, and associated data into linguistic corpus 124 and retrains CLM 126 utilizing the adjusted corpus and associated training and testing sets.

Figure 3A:
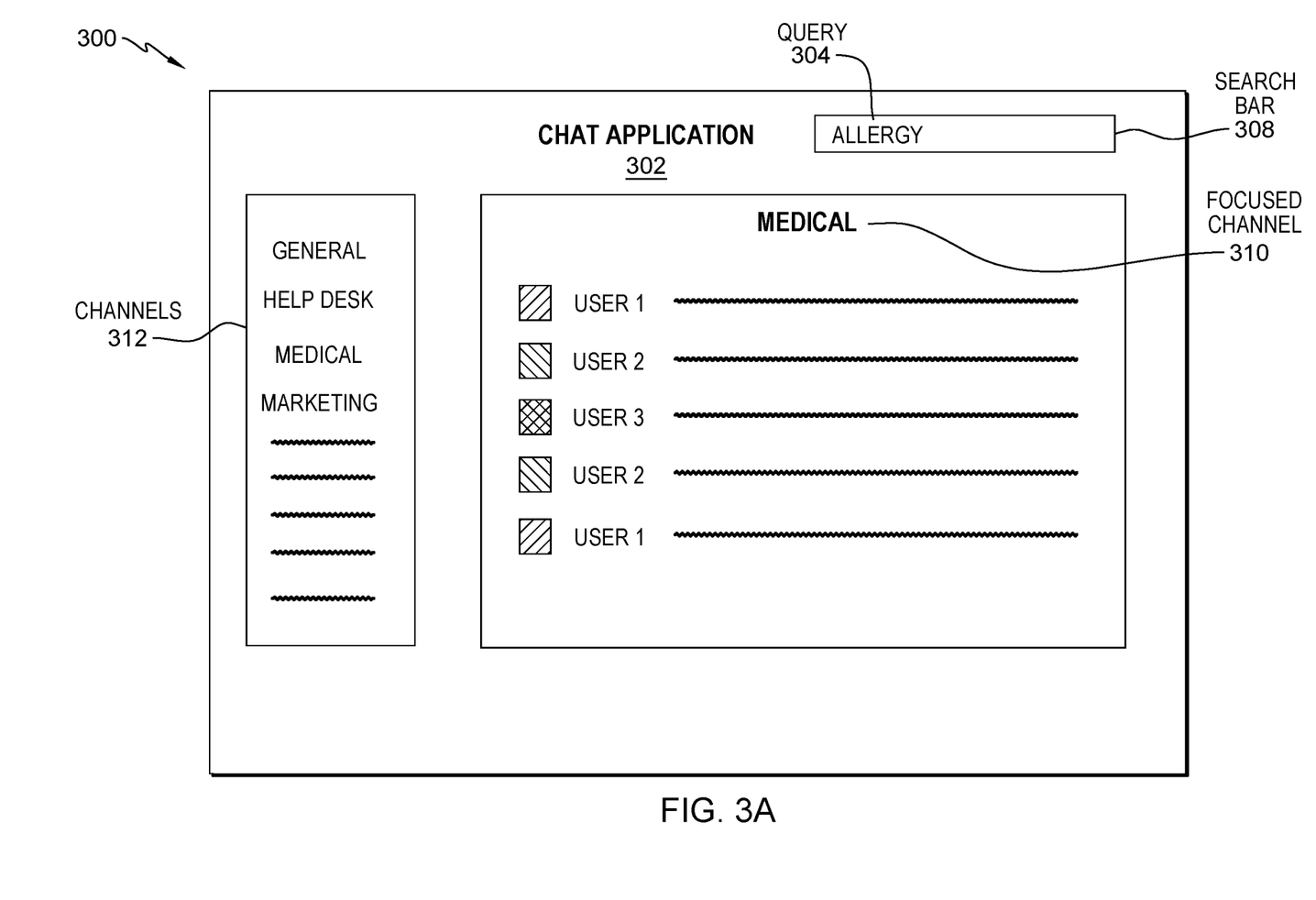
FIG. 3A depicts example 300 illustrative of a collaborative real-time communication session, in accordance with an embodiment of the present invention.

FIG. 3A depicts example 300 illustrative of a collaborative real-time communication session, an example discussion of a problem-solving session between a plurality of users. Example 300 includes chat application 302, a real-time communication application, query 304, an inputted search query, search bar 308, a text input area, focused channel 310, an active and viewable channel, and channels 312, a list of the available channels. Example 300 utilizes corpus linguistic analysis and author analysis as inputs when assessing a query 304.

Figure 3B:
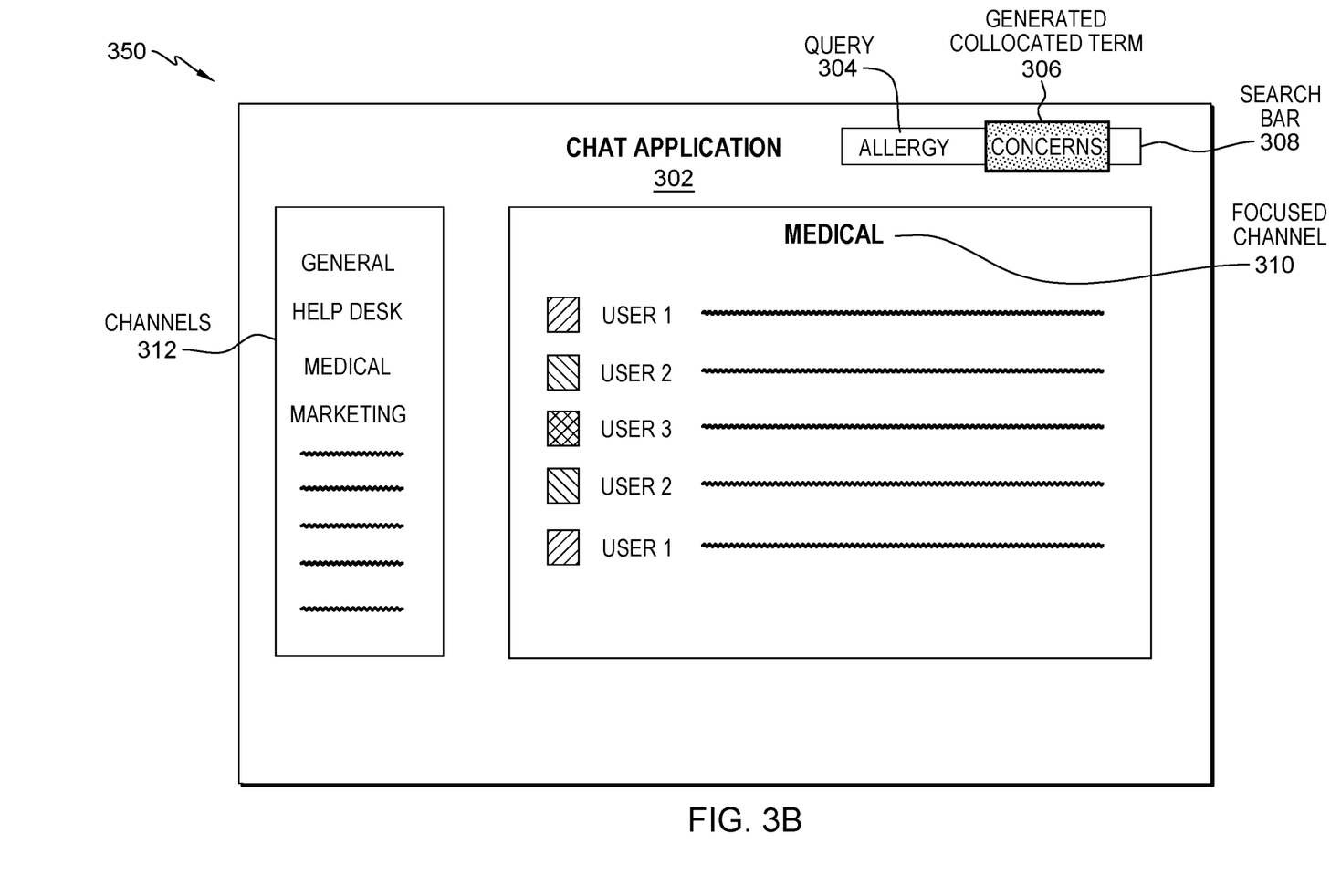
FIG. 3B depicts example 350 illustrative of a collaborative real-time communication session, in accordance with an embodiment of the present invention.

FIG. 3B depicts example 350 illustrative of a collaborative real-time communication session, an example discussion of a problem-solving session between a plurality of users. Example 300 includes chat application 302, a real-time communication application, query 304, an inputted search query, generated collocated term 306, a generated collocated search term, search bar 308, a text input area, focused channel 310, an active and viewable channel, and channels 312, a list of the available channels.

Figure 4:
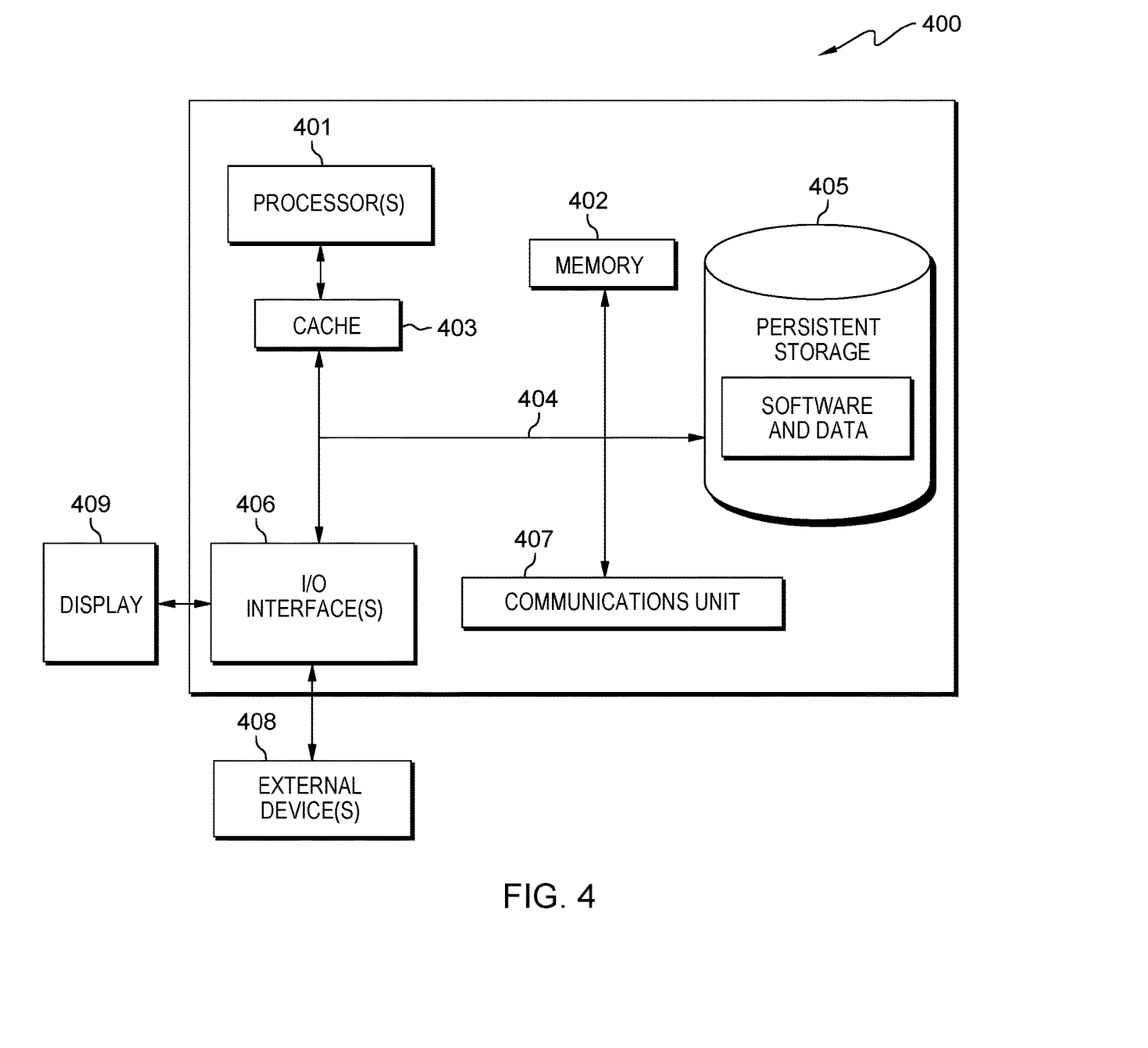
FIG. 4 is a block diagram of components of the server computer executing the program, in accordance with an embodiment of the present invention.

FIG. 4 depicts a block diagram of components of client computing device 110 and server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to client computing device 110. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   training, by one or more computer processors, a corpus link model based on an analysis of a linguistic corpus and an analysis of one or more author metrics;
   generating, by one or more computer processors, one or more collocated terms based on one or more calculations by the trained corpus link model;
   generating, by one or more computer processors, a co-occurrence rating for each of the one or more generated collocated terms, wherein the co-occurrence rating contains one or more probabilities denoting a likelihood that a query is associated with one or more collocated and one or more colligated terms; and
   displaying, by one or more computer processors, the one or more generated collocated terms according to the generated co-occurrence rating of each collocated term.

2. The method of claim 1, further comprising:
   monitoring, by one or more computer processors, one or more queries.

3. The method of claim 2, wherein queries are selected from the group consisting of: real-time chat discourse, user utterances, user comments, user sentences, user search queries, or user search terms.

4. The method of claim 2, wherein monitoring one or more queries comprises:
  detecting, by one or more computer processors, a user inputting a query; and
  extracting, by one or more computer processors, topic information specific to a communication medium contained in the detected query.

5. The method of claim 2, wherein generating one or more collocated terms based on one or more calculations by the trained corpus link model comprises:
  determining, by one or more computer processors, a syntactic or lexical relationship between the one or more monitored queries and the one or more generated collocated terms; and
  determining, by one or more computer processors, a location in a proximity to the query.

6. The method of claim 1, wherein the linguistic corpus contains historical collocated terms, colligated terms, associated topics, and author metrics wherein author metrics comprise author-topic mappings and author channel frequency, author post frequency, author average post length, author average post reading level, and frequently utilized terms by the author.

7. The method of claim 6, wherein training a corpus link model based on the linguistic corpus comprises:
  retrieving, by one or more computer processors, one or more historical communications from the linguistic corpus;
  identifying, by one or more computer processors, one or more queries associated with the retrieved one or more historical communications;
  determining, by one or more computer processors, one or more collocated terms associated with the identified one or more queries; and
  training, by one or more computer processors, the corpus link model based, at least in part, on supervised training utilizing the identified queries and the determined one or more collocated terms.

8. The method of claim 1, further comprising:
  creating, by one or more computer processors, one or more predictive progressive collocation group models based on communications of related or similar groups of an on-going topical matters wherein the predictive progressive collocation group models allow for frequently communicating groups to be profiled utilizing group linguistic patterns.

9. The method of claim 8, further comprising:
  calculating, by one or more processors, one or more collocation trends over a temporal period between a plurality of channels within a chat application utilizing the one or more created predictive progressive group models.

10. The method of claim 1, wherein generating the co-occurrence rating for one or more generated collocated terms utilizes a probabilistic model.

11. The method of claim 1, wherein the corpus link model contains one or more stackable recurrent neural networks.

12. The method of claim 11, wherein generating one or more collocated terms based on one or more calculations by the trained corpus link model, comprises:
  generating, by one or more computer processors, one or more collocated terms at an application level based on one or more stackable recurrent neural networks, wherein each recurrent neural network of the one or more stackable recurrent neural networks are trained based on a different channel contained within a communication medium.

13. The method of claim 1, further comprising:
  displaying, by one or more computer processors, the generated co-occurrence rating of the one or more displayed collocated terms.

14. The method of claim 1, wherein displaying the one or more generated collocated terms according to the generated co-occurrence rating of each collocated term, comprises:
  responsive to exceeding a co-occurrence rating threshold, displaying, by one or more computer processors, the one or more generated collocated terms in a proximity to one or more monitored queries.

15. The method of claim 1, wherein displaying the one or more generated collocated terms according to the generated co-occurrence rating of each collocated term, comprises:
  transforming, by one or more computer processors, one or more stylistic elements of the displayed collocated based on the generated co-occurrence rating, wherein stylistic elements are selected from the group consisting of: font, font size, character style, font color, background color, capitalizations, general transparency, and relative transparency; and
  displaying, by one or more computer processors, the transformed one or more stylistic elements.

16. The method of claim 1, further comprises:
  logging, by one or more computer processors, real-time communications, associated author metrics, associated user post frequency, generated collocated terms, and generated colligated terms into a linguistic corpus; and
  retraining, by one or more computer processors, the corpus link model utilizing the linguistic corpus.

17. A computer program product comprising:
  one or more computer readable storage media and program instructions stored on the one or more computer readable storage media, the stored program instructions comprising:
  program instructions to train a corpus link model based on an analysis of a linguistic corpus and an analysis of one or more author metrics;
  program instructions to generate one or more collocated terms based on one or more calculations by the trained corpus link model;
  program instructions to generate a co-occurrence rating for each of the one or more generated collocated terms, wherein the co-occurrence rating contains one or more probabilities denoting a likelihood that a query is associated with one or more collocated and one or more colligated terms; and
  program instructions to display the one or more generated collocated terms according to the generated co-occurrence rating of each collocated term.

18. The computer program product of claim 17, wherein the program instructions to generate one or more collocated terms based on one or more calculations by the trained corpus link model, comprises:
  program instructions to generate one or more collocated terms at an application level based on one or more stackable recurrent neural networks, wherein each recurrent neural network of the one or more stackable recurrent neural networks are trained based on a different channel contained within a communication medium.

19. A computer system comprising:
  one or more computer processors;

one or more computer readable storage media; and program instructions stored on the computer readable storage media for execution by at least one of the one or more processors, the stored program instructions comprising:

program instructions to train a corpus link model based on an analysis of a linguistic corpus and an analysis of one or more author metrics;

program instructions to generate one or more collocated terms based on one or more calculations by the trained corpus link model;

program instructions to generate a co-occurrence rating for each of the one or more generated collocated terms, wherein the co-occurrence rating contains one or more probabilities denoting a likelihood that a query is associated with one or more collocated and one or more colligated terms; and program instructions to display the one or more generated collocated terms according to the generated co-occurrence rating of each collocated term.

20. The computer system of claim 19, wherein the program instructions to generate one or more collocated terms based on one or more calculations by the trained corpus link model, comprises:

program instructions to generate one or more collocated terms at an application level based on one or more stackable recurrent neural networks, wherein each recurrent neural network of the one or more stackable recurrent neural networks are trained based on a different channel contained within a communication medium.

21. The computer system of claim 19, wherein the program instructions to display the one or more generated collocated terms according to the generated co-occurrence rating of each collocated term, comprises:

program instructions to transform one or more stylistic elements of the displayed collocated based on the generated co-occurrence rating, wherein stylistic elements are selected from the group consisting of: font, font size, character style, font color, background color, capitalizations, general transparency, and relative transparency; and program instructions to display the transformed one or more stylistic elements.

* * * * *